(12) United States Patent
Lin et al.

(10) Patent No.: US 9,989,255 B2
(45) Date of Patent: Jun. 5, 2018

(54) LINER ASSEMBLY AND METHOD OF TURBULATOR FABRICATION

(71) Applicant: GENERAL ELECTRIC COMPANY, Schenectady, NY (US)

(72) Inventors: Dechao Lin, Greer, SC (US); Brian Lee Tollison, Honea Path, SC (US); Srikanth Chandrudu Kottilingam, Simpsonville, SC (US); Yan Cui, Greer, SC (US)

(73) Assignee: General Electric Company, Schenectady, NY (US)

( * ) Notice: Subject to any disclaimer, the term of this patent is extended or adjusted under 35 U.S.C. 154(b) by 743 days.

(21) Appl. No.: 14/341,152

(22) Filed: Jul. 25, 2014

(65) Prior Publication Data
US 2016/0025341 A1    Jan. 28, 2016

(51) Int. Cl.
| | |
|---|---|
| *B23K 31/02* | (2006.01) |
| *F23R 3/00* | (2006.01) |
| *B23K 1/00* | (2006.01) |
| *B23K 1/008* | (2006.01) |
| *B23K 101/00* | (2006.01) |
| *B23K 101/06* | (2006.01) |
| *B23K 101/08* | (2006.01) |
| *B23K 103/04* | (2006.01) |
| *B23K 103/18* | (2006.01) |

(52) U.S. Cl.
CPC .............. *F23R 3/002* (2013.01); *B23K 1/008* (2013.01); *B23K 1/0018* (2013.01); *B23K 31/02* (2013.01); *B23K 2201/001* (2013.01); *B23K 2201/06* (2013.01); *B23K 2201/08* (2013.01); *B23K 2203/04* (2013.01); *B23K 2203/26* (2015.10); *F23R 2900/00017* (2013.01)

(58) Field of Classification Search
CPC ........... F23R 3/002; F23R 2900/00017; B23K 1/008; B23K 1/0018; B23K 31/02; B23K 2203/26; B23K 2203/04; B23K 2201/08; B23K 2201/06; B23K 2201/001
USPC ............ 228/248.1–248.5, 164, 173.1–173.7; 29/889.1–889.722
See application file for complete search history.

(56) References Cited

U.S. PATENT DOCUMENTS

| | | | | |
|---|---|---|---|---|
| 3,025,596 A | * | 3/1962 | Ward ..................... | B23K 20/08 228/107 |
| 5,105,540 A | * | 4/1992 | Rhodes ................. | F28D 1/0391 228/183 |

(Continued)

FOREIGN PATENT DOCUMENTS

| | | | | |
|---|---|---|---|---|
| DE | 3727454 A1 | * | 3/1989 | ............. B21C 37/22 |
| EP | 1050663 A2 | * | 11/2000 | ............. B32B 15/01 |

(Continued)

OTHER PUBLICATIONS

Machine translation of JP 11-141879A (no date available).*

*Primary Examiner* — Kiley Stoner
(74) *Attorney, Agent, or Firm* — Charlotte C. Wilson; Ernest G. Cusick; Frank A. Landgraff

(57) ABSTRACT

A method of turbulator fabrication is provided and includes additively disposing an elongate flexible member in tension onto a liner body, dispensing braze paste at an elongate flexible member-liner body interface and conducting a brazing process with respect to the braze paste to attach the elongate flexible member to the liner body.

13 Claims, 3 Drawing Sheets

(56) References Cited

U.S. PATENT DOCUMENTS

| | | | | |
|---|---|---|---|---|
| 5,241,827 A | * | 9/1993 | Lampes | F01D 5/184 |
| | | | | 60/754 |
| 5,460,002 A | * | 10/1995 | Correa | F23R 3/002 |
| | | | | 60/723 |
| 6,426,152 B1 | * | 7/2002 | Johnson | B23K 1/0008 |
| | | | | 228/119 |
| 6,681,578 B1 | | 1/2004 | Bunker | |
| 7,104,067 B2 | | 9/2006 | Bunker | |
| 2002/0076571 A1 | * | 6/2002 | Johnson | B23K 1/0008 |
| | | | | 428/553 |
| 2003/0188850 A1 | * | 10/2003 | Liu | B01D 53/8675 |
| | | | | 165/109.1 |
| 2004/0074239 A1 | * | 4/2004 | Tiemann | F23M 5/02 |
| | | | | 60/798 |
| 2009/0032224 A1 | * | 2/2009 | Numata | B23K 1/0012 |
| | | | | 165/104.19 |
| 2009/0071639 A1 | * | 3/2009 | Numata | B21C 37/158 |
| | | | | 165/172 |
| 2010/0186415 A1 | | 7/2010 | Brown et al. | |
| 2010/0322776 A1 | * | 12/2010 | Laurent | B29B 11/16 |
| | | | | 416/230 |
| 2012/0036858 A1 | * | 2/2012 | Lacy | F23R 3/002 |
| | | | | 60/754 |
| 2012/0208141 A1 | * | 8/2012 | Siddagangaiah | F23R 3/002 |
| | | | | 431/350 |
| 2012/0304654 A1 | | 12/2012 | Melton et al. | |
| 2013/0095342 A1 | * | 4/2013 | Schick | B23K 1/008 |
| | | | | 428/600 |
| 2013/0180252 A1 | | 7/2013 | Chen | |
| 2014/0220376 A1 | * | 8/2014 | Schick | B32B 15/01 |
| | | | | 428/615 |
| 2015/0165547 A1 | * | 6/2015 | Lin | B23P 15/008 |
| | | | | 60/752 |
| 2015/0217352 A1 | * | 8/2015 | Kappenstein | B23K 26/38 |
| | | | | 138/154 |

FOREIGN PATENT DOCUMENTS

| | | |
|---|---|---|
| JP | 09196377 A * | 7/1997 |
| JP | 11-141879 A * | 5/1999 |
| WO | 9906771 A1 | 11/1999 |

* cited by examiner

LINER ASSEMBLY AND METHOD OF TURBULATOR FABRICATION

BACKGROUND OF THE INVENTION

The subject matter disclosed herein relates to a liner assembly and a method of turbulator fabrication and, more particularly, to turbulator fabrication for a combustor liner.

Gas turbine engines typically include a compressor, a combustor and a turbine section. Inlet air is compressed in the compressor and the compressed air is mixed with fuel to form a fuel/air mixture, which is combusted within the combustor to generate products that are directed to the turbine section. Within the turbine section, the products are expanded to generate mechanical energy that can be converted into power or electricity.

The combustor often has a liner that is formed to define an interior in which the combustion occurs. The liner is surrounded at a head end of the combustor by portions of an end cover and at a downstream end of the combustor by a sleeve. The portions of the end cover and the sleeve both cooperatively define one or more annuluses about the exterior surface of the liner through which airflow is permitted. This airflow may be disturbed by the presence of a turbulator provided about the exterior surface of the liner. Such disturbances increase heat transfer effects such that heat is removed from the liner and damage from high temperatures can be avoided.

In general, the turbulator is formed on the exterior surface of the liner by a machining process. The machining process gradually removes material from the exterior surface until the turbulator is formed with the desired shape and size.

BRIEF DESCRIPTION OF THE INVENTION

According to one aspect of the invention, a method of turbulator fabrication is provided and includes additively disposing an elongate flexible member in tension onto a liner body, dispensing braze paste at an elongate flexible member-liner body interface and conducting a brazing process with respect to the braze paste to attach the elongate flexible member to the liner body.

According to another aspect of the invention, a method of turbulator fabrication is provided and includes arranging a liner body in a standing position, spirally wrapping an elongate flexible member in tension onto the liner body, dispensing braze paste at an upper corner of an elongate flexible member-liner interface and conducting a brazing process with respect to the braze paste to attach the elongate flexible member to the liner body.

According to yet another aspect of the invention, a liner assembly is provided and includes a liner body having an exterior surface, an elongate flexible member additively disposed onto the exterior surface in tension and a braze joint formed at an interface between the exterior surface and the elongate flexible member.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
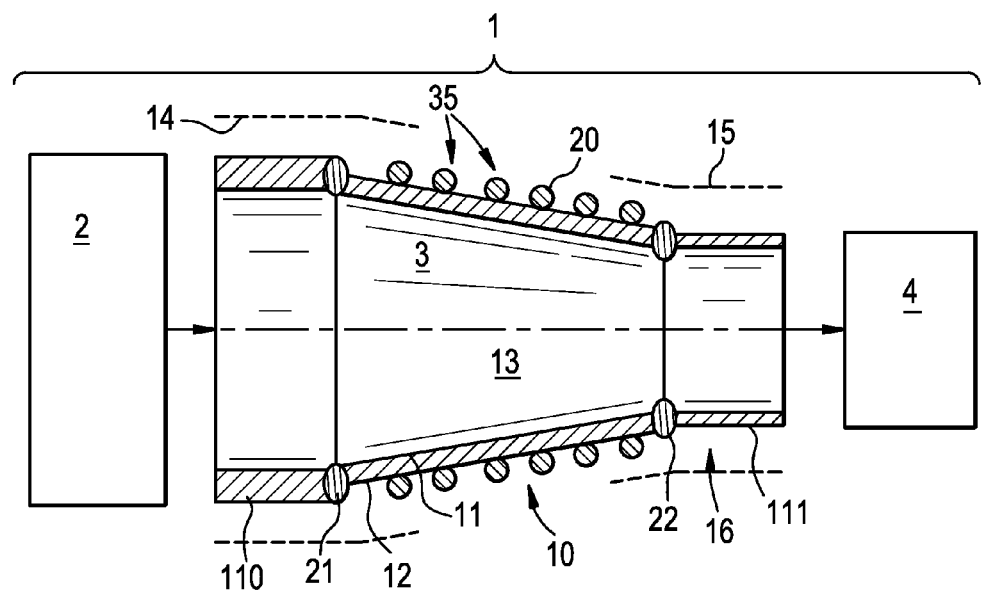
FIG. 1 is a schematic illustration of a gas turbine engine including a liner assembly in accordance with embodiments.
Figure 2:
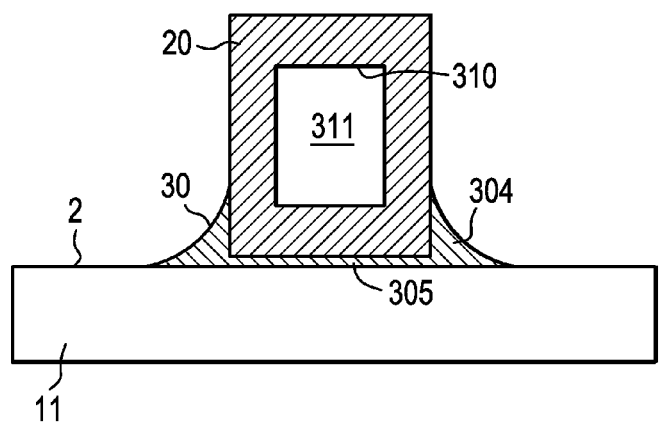
FIG. 2 is a cross-sectional illustration of an elongate flexible member of a liner assembly in accordance with embodiments.

The detailed description explains embodiments of the invention, together with advantages and features, by way of example with reference to the drawings.

DETAILED DESCRIPTION OF THE INVENTION

The description provided below relates to a liner assembly and to a method of turbulator fabrication in which a liner assembly is formed by additive disposal of an elongate flexible member with various geometries or shapes on a liner body, dispensation of braze paste on an upper corner of the elongate flexible member-liner body interface and brazing of the braze paste. The liner assembly can thus be formed with about 30% less raw materials, in much less time than was previously possible (from 10 hour processing times to 1 hour processing times) and with less wasted material.

With reference to FIGS. 1-6, a liner assembly 10 is provided. The liner assembly 10 may be provided as a stand-alone component or as a part of a combustor assembly of a gas turbine engine 1. In the latter case, the gas turbine engine 1 includes a compressor 2, a combustor 3 and a turbine section 4. During operation of the gas turbine engine 1, inlet air is compressed in the compressor 2 and the compressed air is mixed with fuel to form a fuel/air mixture. This fuel/air mixture is combusted within the combustor 3 to generate products of combustion that are directed to the turbine section 4. Within the turbine section 4, the products of combustion are expanded to generate mechanical energy that can be converted into power or electricity.

The liner assembly 10 serves as a liner for the combustor 3 and in that capacity the liner assembly 10 includes a liner body 11. The liner body 11 may have a frusto-conical shape with a relatively wide head end portion 110 and a relatively narrow downstream end portion 111. The liner body 11 has an exterior surface 12 and is formed to define an interior 13 in which the combustion occurs. The liner body 11 is surrounded at a head end of the combustor 3 by portions of an end cover 14 and at a downstream end of the combustor 3 by a sleeve 15. The portions of the end cover 14 and the sleeve 15 both cooperatively define one or more annuluses 16 about the exterior surface 12 through which airflow is permitted.

As shown in FIG. 1, the liner assembly 10 further includes an elongate flexible member 20, such as a metallic, plastic or composite wire, which is additively disposed in at least temporarily maintained tension onto and about the exterior surface 12, and a braze joint 30 (see FIGS. 2-6). When the braze joint 30 is formed, the braze joint 30 and the elongate flexible member 20 cooperatively form a turbulator 35. The braze joint 30 is formed at an interface 40 (see FIGS. 2-6) defined between the exterior surface 12 and the elongate flexible member 20. The elongate flexible member 20 thus acts as at least a portion of the turbulator 35 for the liner assembly 10 and disturbs the airflow in the one or more annuluses 16.

The elongate flexible member 20 may be arranged about the liner body 11 and connected to the exterior surface 12 by the braze joint 30 in a spiraling pattern (with, e.g., a 0.25-0.5 inch pitch spacing range) or in another pattern as a single continuous feature or as multiple discrete features. The elongate flexible member 20 may be additionally connected or welded to the liner body 11 at predefined locations such as opposite first and second ends 21 and 22 of the elongate flexible member 20. That is, the first end 21 of the elongate flexible member 20 may be welded or tack welded to the liner body 11 at the head end portion 110 and the second end 22 of the elongate flexible member 20 may be welded or tack welded to the liner body 11 at the downstream end portion 111.

In accordance with embodiments, the braze joint 30 may include various materials including, but not limited to, nickel and aluminum and/or any other materials that are braze process compatible with the liner body 11.

Figure 3:
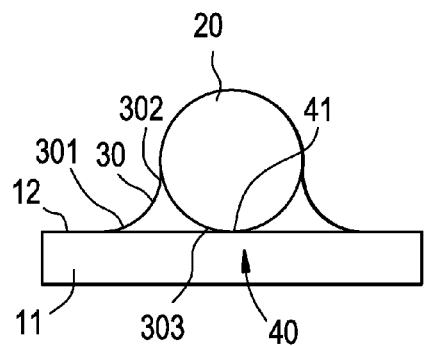
FIG. 3 is a cross-sectional illustration of an elongate flexible member of a liner assembly in accordance with embodiments.

As shown in FIGS. 2-6, the braze joint 30 may have a rounded cross-sectional shape 31 with concave transitions for promoting fatigue resistance. In particular, as shown in FIG. 3, the braze joint 30 may have a fillet shape with three asymptotic regions 301, 302, 303. Region 301 points away from the elongate flexible member 20 and lies along the exterior surface 12. Region 302 points away from the exterior surface 12 and runs along the elongate flexible member 20. Region 303 points inwardly toward the interface 40 and runs along the exterior surface 12. Region 303 may connect with a complimentary region 303 extending from the opposite side of the braze joint 30 via holes 41 defined through the interface 40 as a result of surface imperfections and process tolerances.

In accordance with various embodiments, the elongate flexible member 20 may have an angular cross-sectional shape (see the rectangular wire 20 of FIG. 2) or a rounded cross-sectional shape (see the rounded wires 20 of FIGS. 3-6). In each case, a determination of how to shape the elongate flexible member 20 will be made in accordance with various factors including, but not limited to, heat transfer requirements.

Figure 4:
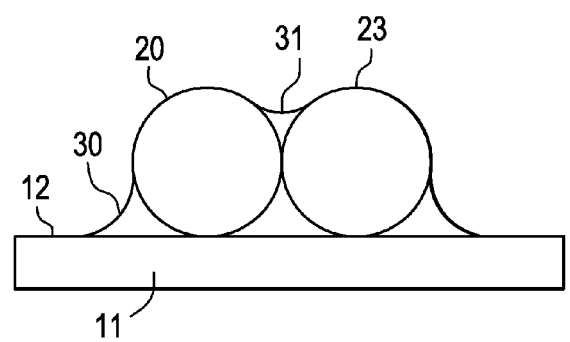
FIG. 4 is a cross-sectional illustration of an elongate flexible member of a liner assembly in accordance with embodiments.
Figure 5:
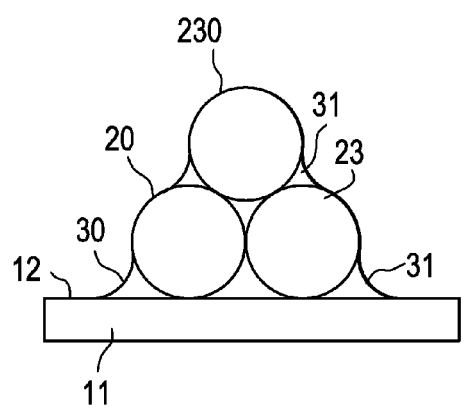
FIG. 5 is a cross-sectional illustration of an elongate flexible member of a liner assembly in accordance with embodiments.
Figure 6:
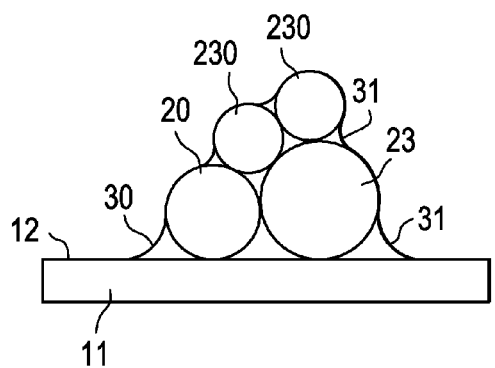
FIG. 6 is a cross-sectional illustration of an elongate flexible member of a liner assembly in accordance with embodiments.

As shown in FIGS. 4-6, the liner assembly 10 may include additional wires 23 and additional braze joints 31. The additional wires 23 may be additively disposed in at least temporarily maintained tension onto and about the exterior surface 12 proximate to a previously additively disposed wire 20 (see FIG. 4) or may be additively disposed in at least temporarily maintained tension as a second level additional wire 230 onto and about one or more previously additively disposed wires 20, 23 (see FIGS. 5 and 6). The additional braze joints 31 are formed at interfaces between the exterior surface 12 and the additional wire 23 (see FIG. 4) or at interfaces between the previously additively disposed wire(s) 20, 23 and the second level additional wire(s) 230 (see FIGS. 5 and 6).

A method of turbulator fabrication will now be described with reference to FIG. 7. The method includes arranging the liner body 11 in a substantially vertical standing position on a rotatable jig 50 and spirally wrapping the elongate flexible member 20 in at least temporarily maintained tension onto and about the liner body 11. The rotatable jig 50 may include a fixture 51 on which a weight of the liner body 11 is directly supported. The rotatable jig 50 may also be paired with an additional fixture 52 at a distal end of the liner body 11.

The spiral wrapping of the elongate flexible member 20 may be accomplished by first welding (e.g., tack welding) at least one of the first and second ends 21 and 22 (see FIG. 1) of the elongate flexible member 20 to the liner body 11. Then, with at least one end of the elongate flexible member 20 welded to the liner body 11 for anchoring support, the spiral wrapping proceeds by a driving of a rotation of the jig 50 using a servo motor 53 and, at the same time, a movement of the elongate flexible member spool 60 along a longitudinal axis A of the liner body 11. The elongate flexible member spool 60 includes an axle 61 on which a wheel 62 is rotatably disposed with the elongate flexible member 20 being partially wrapped on the wheel 62. Thus, the rotation of the jig 50 causes the liner body 11 to rotate and to thereby draw a length of the elongate flexible member off of the wheel 62 in a dispensing action via a guide 63. In accordance with alternative embodiments, the liner body 11 may be arranged in another orientation and, in such cases, the movement of the elongate flexible member spool 60 will still be directed along the longitudinal axis A.

Figure 7:
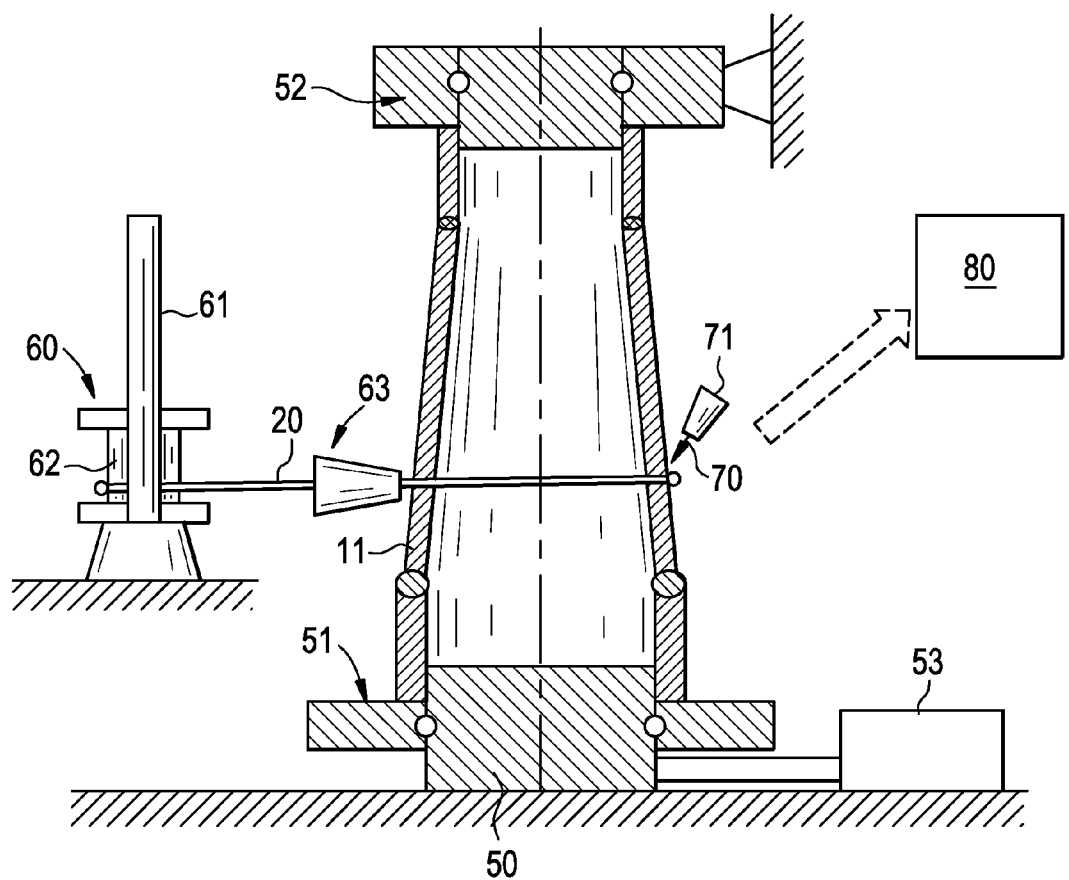
FIG. 7 is a diagram of a method of turbulator fabrication in accordance with embodiments.

As shown in FIG. 7, the method may further include a dispensing of braze paste 70 via a nozzle 71 at an upper corner of the elongate flexible member-liner interface 40 and a conducting of a brazing process with respect to the braze paste 70 in, e.g., a vacuumed oven 80, in order to attach the elongate flexible member 20 to the liner body 11 and to form the turbulator 35. During this brazing process, the braze paste 70 will seep through the holes 41 defined through the interface 40 as a result of surface imperfections and process tolerances to form the brazed joint 30 on both sides of the elongate flexible member 20 or will flow around an exterior surface of the elongate flexible member 20.

For the additional wires 23, 230 and the additional braze joints 31 of FIGS. 4-6, the method illustrated in FIG. 7 may be repeated as required to form the desired turbulator 35 shape.

With reference back to FIG. 2, further or alternative embodiments will embodiments will now be discussed. For example, where the elongate flexible member 20 is configured to form an extended contact surface with the exterior surface 12 as in the case where the elongate flexible member 20 has the angular cross-sectional shape illustrated in FIG. 2, the braze joint 30 may be formed to include an external portion 304 and an internal portion 305 that runs along the extended contact surface between the elongate flexible member 20 and the exterior surface 12. As a further example, the elongate flexible member 20 may include an interior facing surface 310 formed to define an interior space 311 such that the elongate flexible member 20 may be substantially hollow or filled with a filler material of some suitable type or composition.

It will be understood that although the further or alternative embodiments described above have been discussed with reference to FIG. 2, the further or alternative embodiments are applicable to all of the other embodiments described herein. Thus, the elongate flexible member 20 could include the interior facing surface 310 and be substantially hollow or filled with filler material in the case where the elongate flexible member 20 has the rounded cross-sectional shape of FIGS. 3-6. Moreover, the cross-sectional shape of the interior space 311 need not mimic the cross-sectional shape of the elongate flexible member 20 as a whole such that, where the elongate flexible member 20 has the angular cross-sectional shape illustrated in FIG. 2, the interior space 311 may be rounded and vice versa.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of turbulator fabrication, the method comprising:
    arranging a liner body in a standing position with a longitudinal axis of the liner body oriented in a vertical direction;
    additively disposing an elongate flexible member in tension from a spool onto the liner body by welding an end of the elongate flexible member to the liner body and wrapping the elongate flexible member onto the liner body while maintaining tension in the elongate flexible member;
    dispensing braze paste at an elongate flexible member-liner body interface; and
    conducting a brazing process with respect to the braze paste to attach the elongate flexible member to the liner body.

2. The method according to claim 1, wherein the arranging the liner body in the standing position comprises disposing the liner body on a rotatable jig; and
    wherein the method further comprises rotating the jig.

3. The method according to claim 1, further comprising:
    additively disposing a wire in tension onto the liner body proximate to the previously disposed elongate flexible member or onto the previously disposed elongate flexible member; and
    dispensing braze paste at an interface between the previously disposed elongated flexible member, the wire, and, optionally, the liner body.

4. The method according to claim 1, wherein the dispensing is conducted during or following the wrapping.

5. The method according to claim 4, wherein the conducting of the brazing process is completed in a vacuum.

6. A method of turbulator fabrication, the method comprising:
    arranging a liner body in a standing position with a longitudinal axis of the liner body oriented in a vertical direction;
    spirally wrapping an elongate flexible member in tension onto the liner body by moving along the longitudinal axis an elongate flexible member spool in which the elongate flexible member is partially contained and from which the elongate flexible member is dispensable;
    dispensing braze paste at an upper corner of an interface between the elongate flexible member and the liner body; and
    conducting a brazing process with respect to the braze paste to attach the elongate flexible member to the liner body.

7. The method according to claim 6, wherein the arranging of the liner body comprises disposing the liner body on a rotatable jig; and wherein the spirally wrapping of the elongate flexible member comprises rotating the jig.

8. The method according to claim 6, further comprising:
    wrapping a second elongate flexible member in tension onto the liner body proximate to the previously wrapped elongate flexible member; and
    dispensing braze paste on an interface of the previously wrapped elongate flexible member, the second elongate flexible member, and, optionally, the liner.

9. The method according to claim 8, further comprising:
    wrapping a third elongate flexible member in tension onto one or more of the previously wrapped elongate flexible member and the second elongate flexible member; and
    dispensing braze paste on an interface of the third elongate flexible member and at least one of the previously wrapped elongate flexible member and the second elongate flexible member.

10. The method according to claim 6, wherein the spirally wrapping of the elongate flexible member comprises welding opposite ends of the elongate flexible member onto the liner body.

11. The method according to claim 6, wherein the dispensing is conducted during or following the wrapping.

12. The method according to claim 6, wherein the conducting of the brazing process is completed in a vacuum.

13. The method according to claim 6, wherein the elongate flexible member is hollow.

* * * * *